United States Patent Office 3,533,534
Patented Oct. 13, 1970

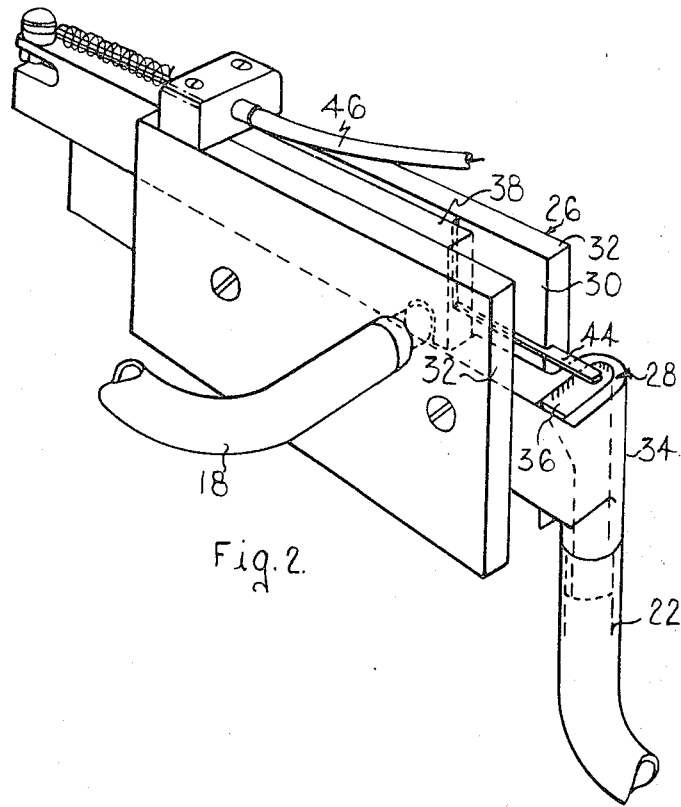
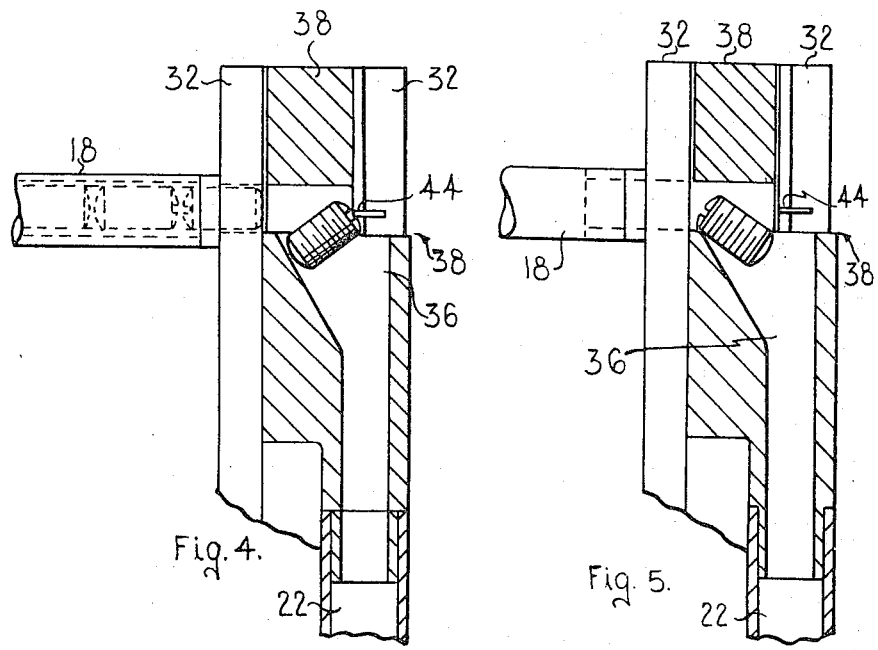

3,533,534
APPARATUS FOR ORIENTING SCREWS AND THE LIKE
Richard Hart Gaydon, "Waratah," Laneside Drive, Bramhall, Cheshire, England
Filed Dec. 30, 1965, Ser. No. 517,736
Int. Cl. B23g 7/06
The portion of the term of the patent subsequent to Aug. 29, 1985, has been disclaimed
U.S. Cl. 221—171          8 Claims

ABSTRACT OF THE DISCLOSURE

A pusher laterally moves screws along a knife edge which engages the screw slot to orient the screw by allowing the other end to fall first through an aperture. When the unslotted end is presented to the knife edge, that end is deflected first by the edge downwardly through the aperture.

---

This invention concerns methods and means for feeding screws, pins, dowels or the like, and more particularly concerns methods and means for feeding non-symmetrical screws, pins, dowels or the like to a working position on machines such as screws or pin driving machines or presses, oriented lengthwise in desired manner.

By "non-symmetrical" I mean that a screw, pin, dowel or the like has dissimilarities of weight and/or shape at its respective ends. Thus, a socket headed grub screw will usually, by virtue of the presence of the socket head, be out-of-balance about its longitudinal mid-point (i.e., it has both a weight and shape difference); a grub screw with a chamfer at one end and a screw-driver slot at the other end, although perhaps being in balance about its mid-point, has obviously, a shape difference; and a perfectly symmetrical shaped dowel made of materials of different density at its respective ends has a weight difference.

For convenience, I shall, in the more general parts of this specification and the claiming clauses thereof refer to screws, pins, dowels and the like compendiously as "screws."

The object of my invention is to provide an improved method and means for feeding unsymmetrical screws (especially headless screws) to a given station correctly oriented lengthwise.

The present invention provides a method of orienting unsymmetrical screws lengthwise, in which the screws, oriented randomly lengthwise, are fed successively into a selected position for sensing, where the direction of their lengthwise orientation is sensed, each screw of at least one direction of orientation then being tilted about a generally horizontal or inclined axis in one direction or another, according to its respective orientation, so that the final orientation of all screws is the same, characterized in that each screw is positively positioned lengthwise relative to tilting means in a manner related to the nature of its unsymmetry and is then moved laterally to said tilting means.

Where the screws are unsymmetrically shaped the method according to the invention includes the step of feeding said screws randomly, as far as their lengthwise orientation is concerned, in succession to a locating means, which locating means is adapted to dispose each screw differently relative to a discharge means according to which way it is oriented lengthwise, and feeding each screw when so disposed to said discharge means whereupon, due to its disposition, it is enabled to proceed with a given end only leading.

Where the screws are unsymmetrically weighted the method according to the invention includes the steps of feeding said screws randomly, as far as their lengthwise orientation is concerned, in succession to a locating means, which locating means is adapted to dispose each screw in like manner relative to a discharge means which includes a balancing device and feeding each screw to said balancing device whereupon it is enabled to fall to one side or the other of said device but always with the heavier end leading.

The invention also includes apparatus for orienting unsymmetrical screws lengthwise which includes means for feeding the screws in succession, oriented lengthwise at random, into a selected position for sensing, sensing means for sensing the direction of their lengthwise orientation, tilting means for imparting tilting movement to each screw of at least one direction of orientation, in one direction or another depending upon its orientation, and discharging means for receiving the screws from the tilting means and discharging them with uniform orientation, characterized by means for causing each screw to be positively positioned lengthwise relative to said tilting means in a manner relative to the nature of its unsymmetry and by means for causing it then to be moved laterally to said tilting means.

The invention will now be described further by way of example with reference to the accompanying drawings in which:

FIG. 2 is a perspective view of part of the machine of FIG. 1 to a larger scale;

FIGS. 4 and 5 are sectional elevations showing further details of the part illustrated in FIG. 2 to a yet larger scale.

Figure 1:
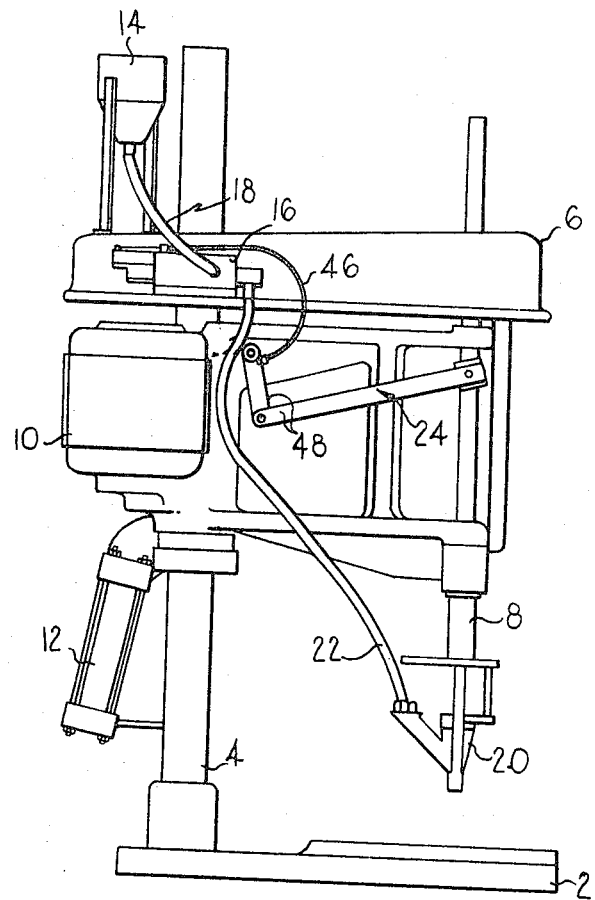
FIG. 1 is a side elevation of a pneumatically operated screw-driving machine according to the invention.
Figure 3:
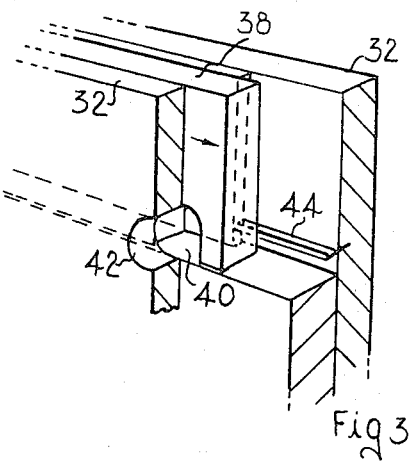
FIG. 3 is a perspective view, partly in section, showing some details of the part illustrated in FIG. 2, and to a still larger scale.

Referring first to FIG. 1 a screw-driving machine comprises a base 2, and a vertical column 4 which supports a working head 6. The working head 6 incorporates a spindle 8, a driving motor 10 for driving the spindle 8, pneumatic means 12 for reciprocating the spindle 8 vertically, a bowl feeder 14 mounted at a high level on the head 6, screw orienting means 16 connected by a screw feed pipe 18 to the bowl feeder 14, a spring collect assembly 20 connected to the screw orienting means 16 by a screw feed pipe 22, and actuating means 24 for the screw orienting means 16.

The screw driving machine which constitutes the particular embodiment of the invention being described is designed so that grub screws having a screw-driver slot in one end loaded randomly into the bowl feeder 14 are presented one by one to the spring collect 20 as required, with their slotted ends trailing, whereby the slots may be properly engaged by the driver of the machine and introduced into a workpiece. Many of the parts of the machine are well-known in the art and will not, for this reason, be described further in any detail.

Reference will now be made to FIGS. 2 to 5 which show the construction of the screw orienting means 16.

The orienting means 16 consists basically of means 26 for locating each grub screw (as it is fed thereto from the bowl feeder 14 via tube 18) lengthwise in one of two positions according to whether the slotted end leads or trails, and means for feeding each grub screw when so located lengthwise to a discharge means in the form of a gravity feed station 28 from whence it passes via tube 22 to the spring collect 20.

The bowl feeder 14 is placed at a level higher than the locating means so that grub screws may be fed (randomly so far as their lengthwise orientation is concerned) by gravity to the locating means 26 and the locating means 26 is placed at a level higher than the spring collet so that the grub screws may pass likewise by gravity from the one to the other.

The locating means 26 consists of a metal assembly defining a rectilinear slot or channel 30 the distance between the side walls 32 of which is in excess of the length of a grub screw by at least the depth of the screw driver slot in the latter. The gravity feed station 28 is at one end of the channel 30 and located there is a metal block 34, the upper surface of which is contiguous with the lower surface of the channel and having a downwardly extending aperture 36 therethrough of generally oblong section, the dimensions of which will be later described.

The channel 30 of the locating means 26 accommodates a closely fitting pusher 38. The lower surface of the pusher 38 has adjacent one end which lies within the channel 30, a transverse notch 40 capable of loosely accommodating a grub screw longitudinally thereof. One of the side walls 32 of the locating means 26 which defines the channel 30 has an aperture 42 drilled therein at the same level as the notch 40 across the pusher 38 and one end of the feed tube 18, which is of transparent plastic material, is connected thereto so as to enable grub screws fed to the tube 18 by the bowl feeder 14 to pass under the influence of gravity through the aperture 42 and into the notch 40 of the pusher 38 when the latter is appropriately positioned. The other side wall 32 of the locating means 26 is rabbeted from the end adjacent the gravity feed station for a distance back terminating just before the position of the drilled aperture 42 in the other side wall 32 and accommodates in the rabbet a metal strip which is secured thereto and is so shaped that a knife edge 44 running parallel to the base of the channel 30 and of a thickness somewhat less than the width of the slots in the grub screws is presented. The strip extends over the gravity feed station 28 beyond the end of the channel 30.

The lower end of the aperture block 34 at the gravity feed station 28 has attached thereto the upper end of the feed tube 22 leading to the collet 20 so that grub screws falling through the aperture 36 in the black 34 pass under the influence of gravity to the work position.

Means is provided for reciprocating the pusher 38 in the channel 30 between a position extending out of the channel 30 and over the gravity feed station 28 to a position retracted within the channel 30 where the notch 40 is aligned with the drilled aperture 42. Reciprocation of the pusher 38 is synchronized with the operation of the machine so that when one grub screw is being inserted into the workpiece the pusher 38 moves forwardly from its retracted to its protruding positions and then moves back again prior to the next operative stroke of the machine. There are clearly a number of ways in which this may be arranged, an appropriate Bowden cable and a solenoid being only two possibilities. In the machine illustrated the actuating means 24 consists of a Bowden cable 46 extending between the rear of the pusher 38 and a linkage 48 connected to the spindle 8 (see FIG. 1).

It will now be convenient to refer to the manner in which the device operates. With the bowl feeder 14 loaded with grub screws and set into operation the grub screws will proceed end to end, randomly oriented, down the feed tube 18 from the bowl feeder 14 to the locating means 26. The pusher 38 will be in its fully retracted position and the leading grub screw will enter the drilled aperture 42 in the side wall 32 and pass into the notch 40 in the pusher 38 to abut the unrabbeted part of the opposite side wall 32. The feed tube 22 from the gravity feed station 28 is primed by hand with a correctly oriented grub screw and this falls through the tube 22 into the spring collet 20 beneath the retracted spindle 8 of the machine.

On operating the machine the last-mentioned grub screw is driven into the workpiece and at the same time the pusher 38 moves forwardly. If the unslotted end of the grub screw lying in the notch 40 of the pusher 38 is leading, this end will abut the knife edge 44 and the screw will be immediately located in the desired position. If, on the other hand, the slotted end is leading then, as the pusher 38 continues to move forward, carrying the grub screw with it in its notch 40, the screw will rotate due to its frictional contact with the base of the channel 30 and eventually its slot will engage the knife edge 44 and thereupon the screw will be appropriately located lengthwise. Thus it will be seen that a screw will take up a slightly different position according to whether the slotted end leads or not. The pusher 38, continuing its forward movement, brings the grub screw out at the gravity feed station 28 and the aperture 36 in the block 34 at this station 28 is so dimensioned that if the slotted end of the grub screw is located on the knife edge 44 the screw will immediately pivot downwards under the influence of gravity with its unslotted end leading (see FIG. 4) and will fall downwards through the aperture 36 into the feed tube 22 and will come to rest with this end abutting the spindle of the machine. If, on the other hand, the unslotted end of the screw is abutting the knife edge 44 the entire screw will fall downwardly and the aperture 36 in the block 34 at the gravity feed station 28 is so dimensioned that the slotted end of the screw will strike the block 34 adjacent the aperture 36 and the unslotted end will then pivot downwardly into the aperture 36 and again the screw will pass with its unslotted end leading down through the feed tube 22 (see FIG. 5). Finally as the spindle 8 of the machine is raised the correctly oriented screw will pass into the spring collet 20 ready for the next operation, whilst the pusher 38 is retracted.

It will of course be necessary in some way to ensure that the grub screws fed to the locating means are urged towards the knife edge and for this purpose the locating means 26 may be tilted at an appropriate angle to achieve this end. Alternatively, compressed air may be introduced to a slot in the side wall 32 of the channel opposite the knife edge for the same purpose. In order not unduly to complicate the drawings this requirement has been ignored.

It will be clear that the embodiment just described may be modified in certain respects without affecting either its basic characteristics on the one hand, or its efficacy on the other.

For example, the locating means 26 may be so designed that adjustments can be made to enable batches of screws of different length and/or diameters to be dealth with. Thus a section of the pusher 38, on the face sliding across the aperture 42, could be milled to provide a rabbet rather less than half the width of the pusher 38 and running back from the notch 40 to a point just beyond the aperture 42 when the pusher 38 is fully forward. The height of the section removed would be such as to allow the insertion of a steel plate within the rabbet, but secured to the wall of the channel 30 at the region of the aperture 42, and of a thickness such as to abut the cut-away face of the pusher. This plate would be in the form of a tunnel and would act as an extension to the notch 40 for shorter screws. Plates of different thicknesses, i.e., providing different lengths of tunnel, would allow screws of different lengths to be accommodated. At the aperture 36, on the side opposite the knife edge 44, an adjustable baffle, in the form of a metal strip, would be needed. Through the center of this strip there would be a slot which would allow it to be correctly adjusted by a locking screw, so as to have the effect of shortening, or lengthening the aperture as necessary. In order to avoid very short screws turning it would be advisable for a strip of spring steel to lead downwards into the aperture from the effective edge of the baffle to fill in the gap created below the baffle as a result of the considerable forward adjustment of the baffle. As far as screw diameter is concerned the aperture 42 and notch 40 could be made large enough to accommodate a range of sizes, but of course, the apertured side wall and pusher could be replaced with others having differently sized notches and aperture respectively if necessary.

The principles of the embodiment described can readily be adapted to cope with unsymmetrical shapes other than that of a screw with a screw driver slot at one end. Thus modifications can be made to enable cone-pointed screws or headed screws to be handled. The former would enter the channel and abut the plain wall and during the forward movement of the pusher a V groove would either accept or reject the end presented, thus effecting the necessary longitudinal shift of the screw. In the case of the latter, instead of a V groove, the channel wall would be undercut to a height a little greater than the diameter of the shank, but smaller than the diameter of the head. The undercut would be continuous with the channel base and be as deep as possible half the length of the screw. Again the necessary longitudinal shift would be obtained. In either case the dimensions of the aperture at the gravity feed station would be such that the appropriate end of the screw struck an edge of the aperture causing it to fall appropriately oriented into the feed tube. Alternatively a balancing device could be used at the gravity feed station. The principles of such a device will be described hereinafter in connection with an alternative embodiment of the invention.

The embodiment of the invention which has just been described in detail with reference to the accompanying drawings operates by virtue of a difference in shape between the two ends of each screw. An alternative embodiment will now be briefly described, the operation of which depends on the fact that each screw is out-of-balance about its longitudinal mid-point.

In this embodiment a screw or pin driving machine or a head therefor incorporates means for orienting screws which are heavier at one end than the other, such as socket-head grub screws, and presenting them suitably oriented at an appropriate position relative to a workpiece.

The orienting means consists basically of a hopper, a balancing means, a supply tube connecting the hopper and the balancing means, and feed tubes leading from the balancing means to the work position. The entire assembly must be disposed so that the balancing of the screws can be carried out effectively. For example the assembly must not be subject to excessive vibration. For this reason the preferred location is somewhat remote from the head.

The balancing means includes a platform to which the screws are gravity fed endwise from the hopper and supply tube, and randomly so far as their leading ends are concerned. Thus the light end of a screw may reach the platform first or the heavier end may do so. On reaching the platform the leading end of the screw meets a stop and the screw comes to rest. Adjacent the platform is a balance block which presents an edge defined by two of its sides which meet at an angle of about 120°, the edge extending from one of the platform edges in a direction transversely of the platform. At the other side of the platform is a pusher mechanism which, when operated, is effective to push a screw lying on the platform laterally to the edge of the balance block so as to be supported at its midpoint.

At each sloping side of the balance block is located the open end of a feed tube, whereby screws falling off the block are conveyed downwardly under the influence of gravity. These two tubes merge into a single tube which leads downwardly to the lower part of the head where the screws are accepted in the work position.

Suitable means are provided to synchronize the pusher movement with the operation of the head.

In operation the hopper is loaded with grub screws, the platform stop and/or the balance block having been appropriately adjusted for the size of the screw. The screws pass randomly down the supply tube and the leading screw comes to rest on the platform against the stop. As the machine operation commences the pusher moves to cause the screw to roll off the platform onto the balance block wherefrom it immediately falls, according to which side its heavier end lies, into one or other of the feed tubes. Whichever tube receives it, the heavier end of the screw leads. The screw then passes without change in its lengthwise orientation to the head and to the work position, there its socket head is presented for engagement with the driving member of the head to be screwed into the workpiece therebeneath.

Clearly, modifications may be made in the embodiment just described. Thus, for example, if the heavier end of the screw is to trail, means must be provided for reversing the screw end-for-end before it reaches the working position. For this purpose the two feed tubes could be interrupted and a slightly inclined platform provided which the leading end of the screw would strike and the screw then fall over into the subsequent part of the tube with the other end leading. Alternatively, and probably more desirably, a single similar simple reversing arrangement might be incorporated in the single tube which leads to the head. Again if the screws were headed, the platform adjacent the balance block would need to support only the central part of the screw so as to clear the head.

In another modification, an alternate balancing means may be used. Instead of a fixed platform, pusher and balancing block, a platform only is provided. This platform, however, is light in weight and is accurately balanced at its mid-point about an axis transversely of the screw length. Suitable adjustable stop means enable each screw supplied to be halted with its mid-position coinciding with the platform balance axis, so that the heavier end of the screw will cause tilting of the platform and feeding of the screw, heavier end leading, to one or other of the feed tubes.

In an alternative arrangement of the embodiment of the invention shown in the drawings the knife edge 44 is replaced by a hardened steel rod or knife edge secured to the pusher 38 and extending horizontally or vertically across the end of the notch 40 remote from the aperture 42. The rod or knife edge is so located that the slot in the end of a screw positioned in the notch 40 with its slotted end pointed away from the aperture 42 will engage the rod or knife edge, either at once or after the screw has been rotated by movement of the pusher. The rod or knife edge thus serves exactly the same purpose as the knife edge 44.

In a further arrangement suitable for use with socket screws, a boss pin is carried on a plate which is secured in the end of the notch 40 remote from the aperture 42. The boss pin extends into the notch 42 in such a position that it will engage in the socket of a screw within the notch and having its socket at the same end of the notch as the boss pin. The boss pin serves the same purpose as the rod or knife edge in the arrangement described in the previous paragraph or as the knife edge 44 in the embodiment of the invention shown in the drawings.

In order to enable headed screws to be handled reliably in the apparatus shown in the drawings, the floor of the channel is advantageously rabbeted along each edge to form two gullies which extend from a point near the aperture to the end of the channel. At the same time, the rear face of the notch in the pusher is rabbeted on each side to leave a central land.

A headed screw entering the channel through the aperture will enter the notch in the manner previously described and will lie at angle resting on its head and its opposite end on the floor of the channel which is flat at this point opposite the aperture. The starting point of the two gullies is such that after one revolution of the screw, when moved by the pusher, the head of the screw will fall into one or other of the gullies according to which way the head is directed and thereafter the screw will be pushed along by the land on the pusher engaging the flank of the screw. Preferably, the gullies are shaped to fit the shape of the head concerned and if the slot in the screw-head is not engaged with the knife edge, the screw can therefore roll along maintaining its axis at right angles to the channel because each of its varying diameters is rolling along a surface appropriately located for the size of the diameter.

The size of the rabbets in the notch surface and in the surface of the floor of the channel are chosen according to the size of the headed screw to be accommodated. When headed screws are fed through tubes, the diameter of the free end of the shank must not be less than half the internal diameter of the tube in order to prevent two adjacent shanks from overlapping and jamming in the tube.

In order to provide an easy means of adjusting the width of the channel in the apparatus shown in the drawings, the portion of the channel wall opposite the aperture is cut away to form a groove in which is located an elongated block adjustable, for example by micrometer screws, towards and away from the other wall of the channel. The block carries the knife edge and the arrangement amounts to making the operative part of the channel wall, i.e., the part which contacts the screws, adjustable in position.

In stead of locating the screwing head at a distance from the orientator as in the apparatus shown in the drawings, the screwing may be effected at the orientator. Thus, the discharge aperture may be arranged to feed directly into a spring collet for holding the screws and the discharge aperture and the collet may be mounted on a part which is capable of up-and-down movement on the orientator. Advantageously, this part is spring loaded upwardly. A vertical hole is formed through the pusher into the roof of the notch and when the pusher has delivered a screw to the discharge aperture, it is held over the aperture and a screwdriver can then descend through the pusher into the discharge aperture and can engage with a screw held in the spring collet directly beneath the aperture. The pressure of the screwdriver will push down the screw and the collet and the part holding it and after screwing is complete the screwdriver will be withdrawn allowing the collet and the part holding it to move upwardly under the influence of their spring loading ready to receive the next screw.

The pusher will then move back to pick up another screw and deliver it to the discharge opening.

With such an arrangement, and in other cases as well, it is advantageous to tilt the floor of the channel in order to ensure that the screws fed into the channel are brought into contact with the knife edge. The walls of the channel and the other parts of the apparatus can thus be maintained vertical and only the channel floor is inclined.

An important modification of the apparatus which facilitates the orientation of screws which have a length the same as or only slightly greater than their diameter will now be described.

When dealing with such screws, a difficult problem arises as to how to allow them to pivot freely at their entry into the discharge aperture without allowing them so much freedom of movement that they can become jammed in the opening or in the tube below it or even turn right over. In the case of screws whose heads are engaged on the knife edge, the problem is not acute since such screws begin to pivot before they enter the discharge aperture and the size of the aperture can be chosen to give proper control over such partly-turned screws. It is then found however that the screws oriented in the opposite direction in the channel cause difficulties. In order to overcome these difficulties, the floor of the channel is shaped so as to partly turn such screws in the opposite sense to the screws engaged on the knife edge. A groove is cut in the floor of the channel starting nearer than the discharge opening than the knife edge by a distance equivalent to at least one revolution of the screw, the bottom of the groove is inclined downwards away from the wall containing aperture. At its starting point, the groove extends across the major part of the floor of the channel but the groove narrows as it approaches the discharge aperture, the side of the groove remote from the wall containing the aperture moving across the floor of the channel towards the other wall.

The effect of this groove is as follows. When the slot of a screw engages on the knife edge, and this will happen before the screw reaches the groove, the slotted end of the screw will rest on the part of the channel floor below the knife edge and the other end of the screw will rest on a part of the channel floor across the groove which part is at the same or only a slightly lower level than the part beneath the slotted end of the screw. The operation of the apparatus is thus virtually unaltered. However, in the case of a screw whose shank end abuts against the knife edge, the screw will fall into the groove when it reaches the groove in its movement along the channel. The inclined side wall of the groove will thereafter push the screw towards the wall of the channel containing the aperture and the inclined bottom of the groove will partly turn the screw for its movement into the discharge opening. In this way, the groove prepares such screws for their entry into the discharge opening and enables the apparatus to deal successfully with screws having a length equal to or only slightly greater than their diameter.

In the embodiment of the present invention in which screws are moved onto a balance edge and allowed to fall with their heavier end downward, the balance edge is advantageously rounded to reduce risk of headed screws catching on it.

In the embodiment of the invention in which screws are pushed onto a balancing platform, the platform advantageously takes the form of a tube with one side or part of a side cut away. The tube is pivoted on an axis perpendicular to the axis of the tube and when it pivots serves to guide screws pushed into it into the aperture arranged to receive them.

What is claimed is:

1. Apparatus for orienting unsymmetrical screws lengthwise, said apparatus comprising,
    means for feeding said screws in succession oriented lengthwise at random into a selected position,
    pusher means for causing the screws to be moved laterally from said selected position to a knife edge means for selectively interengaging said knife edge for sensing the direction of lengthwise orientation,
    tilting means for imparting a tilting movement to each screw having at least one direction of lengthwise orientation, said tilting movement being in one direction of two possible directions dependent upon the direction of lengthwise orientation of said screw,
    said tilting means defining an apperture through which each screw falls under gravity on being pushed thereto by said pusher, said aperture being so shaped that screws positioned according to one direction of lengthwise orientation by said knife edge sensing means will pivot in one direction when falling through said aperture, whereas screws positioned according to the other direction of lengthwise orientation by said knife edge sensing means will pivot in the other direction when falling through said aperture so as to positively position each screw lengthwise in a selected position relative to said tilting means in a manner related to the unsymmetry of the screw, and
    means for receiving the screws from said tilting means for the discharge of said screws in a uniform orientation.

2. Apparatus in accordance with claim 1, wherein the extremities of said screws are of different configuration and the means for positively positioning said screws comprise a channel structure,
    an elongated abutment along the end region of one side of said channel whereby screws extend lengthwise across said channel with one end leading are positioned differently from the screws with the other end leading, said respective ends located in different relation to said abutment, with said channel structure defining an aperture in one wall thereof for feeding said screws into said channel.

3. Apparatus in accordance with claims 1 for orienting unsymmetrically weighted screws, wherein said means for positively positioning each screw lengthwise comprises a platform and a stop, said feeding means being arranged to feed each screw to said platform endwise against said stop, said sensing means and tilting means comprise a balance edge extending at right angles to said platform, said pusher means pushing each screw from its position on said platform on to said balancing edge with its middle point on said edge, whereby the screw tilts with its heavier end downward and into said discharge means.

4. Apparatus for orienting unsymmetrically weighted screws lengthwise, said apparatus comprising, means for feeding said screws in succession oriented lengthwise at random into a selected position, said feeding means arranged to feed each screw to a platform against a stop, pushed means for laterally moving said screws from said selected position to a projection means for sensing the direction of lengthwise orientation, tilting means for imparting a tilting movement to each screw having at least one direction of lengthwise orientation, said tilting movement being in one direction of two possible directions dependent on the direction of orientation of said screw, said sensing means and tilting means comprises a balance edge extending at right angles to said platform, while said pusher means pushes each screw from its position on said platform on to said balancing edge with its middle point on said edge whereby the screw tilts with its heavier end downward, and tubular discharge means for receiving the screws from said tilting means for the discharge of said screws in a uniform orientation.

5. Apparatus for orienting unsymmetrically weighted screws lengthwise, said apparatus comprising, means for feeding said screws in succession oriented lengthwise at random into a selected position, said feeding means positively positioning each screw lengthwise to a platform and endwise against a stop, pusher means for lateraly moving said screws from said selected position to a wedge means for selectively sensing the direction of lengthwise orientation, tilting means for imparting a tilting movement to each screw having at least one direction of two possible directions of lengthwise orientation, said sensing and tilting means comprise a further platform adjacent said first mentioned platform and pivotally mounted about an axis at right angles to the endwise position of each screw against said stop, while said pusher means pushes each screw from its position on said platform on to said pivoted platform with its middle point on said pivot axis whereby the screw tilts the platform with its heavier end downward, said apparatus discharging said screws in uniform orientation through a tubular discharge means.

6. Apparatus for orienting grub screws fed lengthwise at random to a sensing station, comprising, a channel at the sensing station, means for feeding the screws into the channel in succession so that they are positioned transversely of the channel, a pusher in the channel, means for reciprocating the pusher to advance the screws in succession along the channel, a knife edge sensing element in the channel which coacts with the end of each screw lengthwise as it travels along the channel in alternative transverse positions, dependent upon which end of the screw has been presented to the knife edge sensing device, a discharge aperture for receiving the screws delivered by the pusher, and said discharge aperture having a mouth so shaped as to cause the screws to tilt in different directions as they enter the aperture, according to their transverse positions with respect to the channel, whereby all screws will fall through the aperture with uniform lengthwise orientation.

7. Apparatus as in claim 6, wherein the sensing element is a knife edge projection which positions the screw in one of the alternative positions, dependent on whether a slotted end is presented to the knife edge.

8. Apparatus as in claim 6, wherein one wall of the channel has a feed opening disposed opposite the sensing element for receiving the screws fed into the channel, and the pusher has a transverse motor for receiving the screws from the feed aperture.

References Cited

UNITED STATES PATENTS

| | | | |
|---|---|---|---|
| 971,999 | 10/1910 | Hodge | 221—171 |
| 3,069,049 | 12/1962 | Brown | 221—171 |
| 3,134,477 | 5/1964 | Moore | 198—33.1 |

STANLEY H. TOLLBERG, Primary Examiner

U.S. Cl. X.R.

193—43